Dec. 27, 1938.  K. MÖRGELIN  2,142,003
CONVEYER CHAIN
Filed Dec. 23, 1937    2 Sheets-Sheet 1
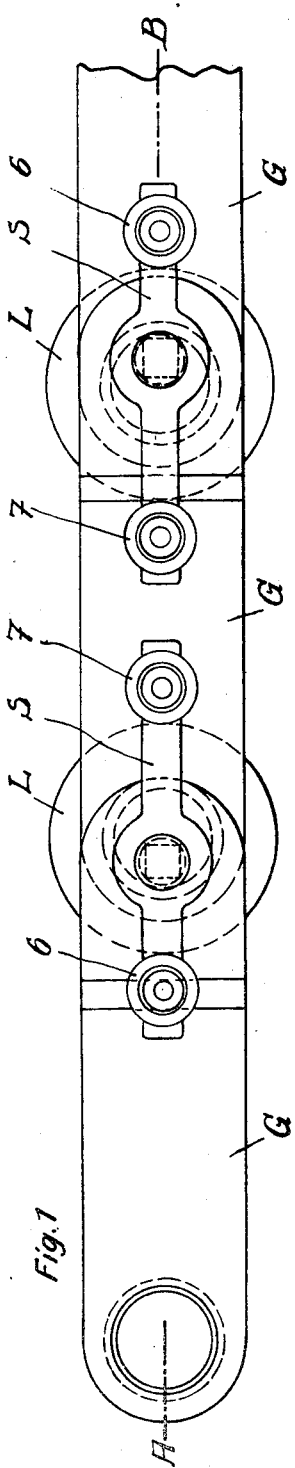
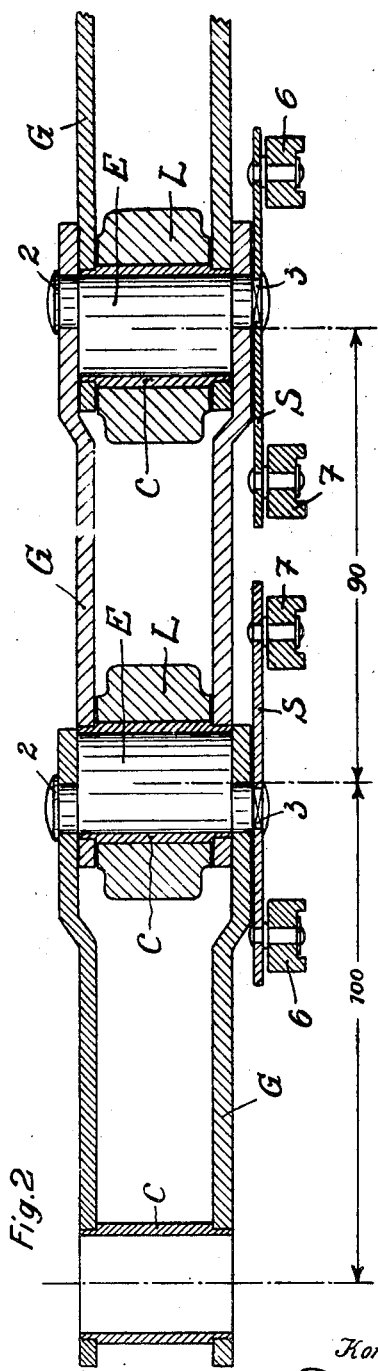
Inventor:
Konrad Mörgelin
Attorney Dec. 27, 1938.　　　K. MÖRGELIN　　　2,142,003
CONVEYER CHAIN
Filed Dec. 23, 1937　　　2 Sheets-Sheet 2

Inventor:
Konrad Mörgelin
Bailey Larson
Attorney.

Patented Dec. 27, 1938

2,142,003

UNITED STATES PATENT OFFICE 2,142,003

CONVEYER CHAIN

Konrad Mörgelin, Karlsruhe, Germany

Application December 23, 1937, Serial No. 181,444
In Germany December 3, 1936

6 Claims. (Cl. 34—48)

This invention relates to a conveyer chain, the length of which is variable while it is in operation. The chain is therefore suitable for use in all branches of industry in which the material carried by the chain requires to be accelerated or retarded during its conveyance on the chain for treatment. The chain in accordance with the present invention can also be used in all cases in which there is a more or less gradual or a sudden contraction or extension of the material which is being conveyed, and also when occasional yielding is necessary owing to alterations, which may be due to the treatment to which it has been subjected, taking place in the length of any material during its conveyance.

The conveyer chain of the present invention is particularly suitable for use in horizontal drying machines for fabrics, especially artificial silk fabrics.

For drying fabrics conveyer devices are usually employed on which the pieces of fabric to be dried are spread out. These devices, however, have the disadvantage that the piece of fabric cannot contract in length during drying as is necessary in the case of artificial silk.

Now, in this field for example, one of the problems with which the present invention is concerned is greatly to facilitate shrinkage of the artificial silk during the drying process by shortening the part of the conveyer chain which is carrying the material, so that considerable contraction of the fabric is possible.

According to the present invention, for the purpose of enabling the chain to be contracted or extended, the jointing pins of the chain are fitted eccentrically in steel bushes and are adjustable by means of levers of any suitable form, which are connected to them and may have one or more arms, in such a manner that, when formed into an endless chain, the total length of the chain does not vary when one part of the chain is shortened and another part is correspondingly lengthened.

In order that the invention may be readily understood and carried into effect, a drying chain in accordance with the invention is illustrated by way of example in the accompanying drawings, in which Figure 1 is an elevation of part of the chain seen from the side on which the actuating levers are arranged.

Figure 2 is a section on the line A—B of Figure 1 showing the side plates of the links, the steel bushes, the eccentric jointing pins, and the actuating levers with rollers mounted on them.

Figure 3:
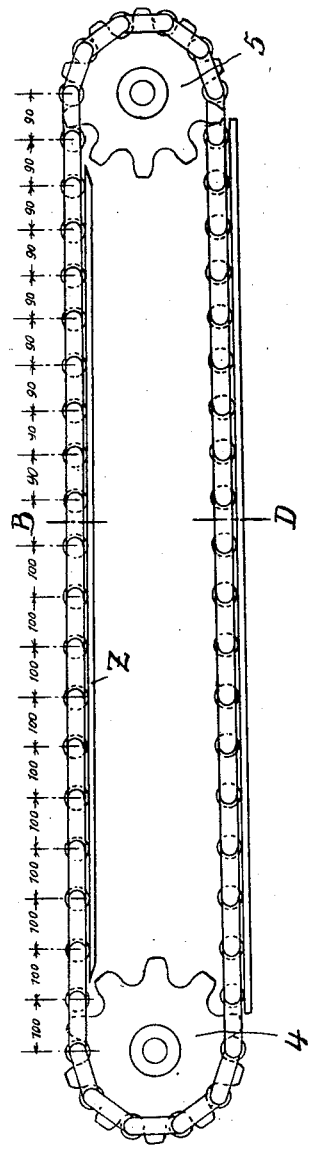
Figure 3 is an elevation showing an endless chain in accordance with the invention running over the two chain wheels with different speeds.

Referring to Figures 1 and 2 of the drawings, the side plates of the individual links of the chain are designated by the reference letter G. Hardened steel bushes C are pressed or shrunk into holes in the side plates which are bent apart at one end and bored to receive eccentric jointing pins E. The eccentric pins can rotate in the steel bushes. At one side, the eccentric pins are each riveted to a washer 2, while at the other side they carry a lever S on a square part 3. Rollers L which run on the steel bushes guide the chain on a rail Z (Figure 3). Two rollers 6 and 7 on each actuating lever are mounted at equal distances from the centre of the eccentric pin.

As shown in Figure 3, the links on the left-hand side of the points B and D where the alteration in pitch is effected have a normal pitch of 100 mm. and the links to the right of these points have a reduced pitch of 90 mm. The endless chain runs over the chain wheels 4 and 5.

If now the pitch of the chain wheel 4 is 100 mm. and the number of teeth on it is 10 and the pitch of the chain wheel 5 is 90 mm. and its number of teeth is also 10, then in spite of the fact that the chain wheels have the same number of teeth and rotate with the same speed of revolution, there is a 10% difference in the speed with which the chain travels round the two chain wheels. This differing speed of the chain around the two chain wheels is made possible because at the point B the actuating lever is turned through an angle of 180° and the pitch of the chain is shortened by 10% and becomes 90 mm. which is the same as the pitch of the teeth of the chain wheel 5, whereby the velocity of the chain is reduced. At the point D, the actuating lever is again turned through an angle of 180° in the opposite sense, whereby the pitch is adjusted to 100 mm., so as to conform to the pitch of the chain wheel 4 and the chain is accelerated.

Figure 4:
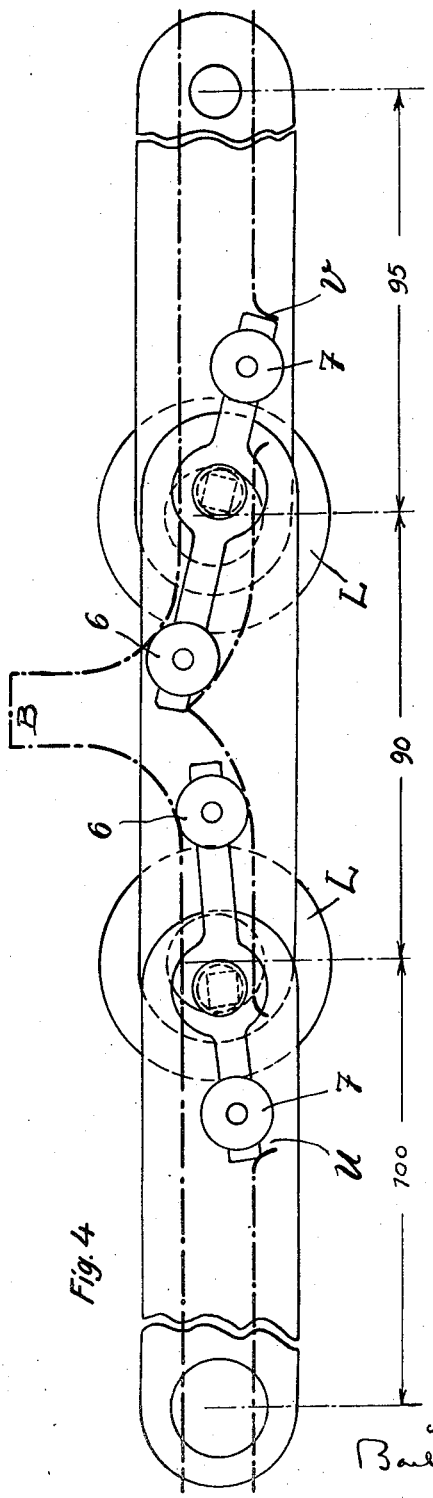
Figure 4 illustrates diagrammatically the reversing device arranged in the path of the actuating levers.

Figure 4 shows the reversing device which is fitted in the path of the actuating levers. The roller 6 is guided upwardly at the point B, while the roller 7 is swung out of the track at U and enters it again at V. The same procedure is repeated in the opposite sense at the point D (Figure 3).

The invention can be employed in machines of many different kinds, for example in horizontal drying machines and the like. A horizontal drying machine has two parallel conveyer chains which are connected together by cross-bars. These cross-bars carry a network on which the material to be dried is placed. During the drying process the material is carried on the network through the various drying chambers. Artificial silk fabrics contract greatly in length during drying and when they are dried on horizontal driers in the manner indicated above, this shrinkage cannot take place freely because the artificial silk to be dried adheres to the surface of the drying network and, owing to friction, there is considerable resistance to its natural tendency to contract. Therefore when drying machines of this kind are employed, sensitive artificial silk fabrics are generally delivered from the drying machine in a dragged condition. The proposal has previously been made to lay the moist material in folds on the drying network. This proposal, however, has not led to satisfactory results because quite small folds cannot be made in the material and large folds overlap and damp impressions are left by them.

If, however, the chain constructed in accordance with the invention is employed, it is possible to shorten the chain at any desired place on the conveying reaches of the chain, whereby shrinkage of the fabric is greatly facilitated.

For this reason, the chains can also be employed on drying frames, such as are used, for example for dressing or finishing fabric.

The invention is not limited to the construction illustrated and the uses mentioned. Thus, for example, various alterations may be made to the actuating levers and also the pitch-changing device. Also the endless chains in accordance with the invention can be used in all cases in which shortening and lengthening of the chain is desirable so that contraction or extension of the material which is being conveyed can take place.

I claim:—

1. A conveyer chain composed of a plurality of links having side plates, bushes connecting said side plates, jointing pins connecting said side plates and bushes of one link to the side plates of the adjoining link, and actuating levers on said jointing pins, said jointing pins being mounted to turn eccentrically in said bushes.

2. A conveyer chain composed of a plurality of links having side plates, bushes connecting said side plates, jointing pins connecting said side plates and bushes of one link to the side plates of the adjoining link, actuating levers on said jointing pins, and means for actuating said levers arranged adjacent the chain, said jointing pins being mounted to turn eccentrically in said bushes.

3. A conveyer chain composed of a plurality of links having side plates, bushes connecting said side plates and jointing pins connecting said side plates and bushes of one link to the side plates of the adjoining link, actuating levers on said jointing pins, rollers on said levers and means engaging said rollers so as to turn said levers through an angle of 180° arranged adjacent the chain, said jointing pins being mounted to turn eccentrically in said bushes.

4. An endless chain composed of a plurality of links having side plates, bushes connecting said side plates, jointing pins connecting said side plates and bushes of one link to the side plates of the adjoining link, actuating levers on said jointing pins, and means for actuating said levers arranged adjacent both the upper and lower reaches of the chain, said jointing pins being mounted to turn eccentrically in said bushes.

5. A conveyer chain comprising a plurality of links having side plates, bushes connecting said side plates, rollers revolvable on said bushes, jointing pins connecting said side plates and bushes of one link to the side plates of the adjoining link, and actuating levers on said jointing pins, said jointing pins being mounted to turn eccentrically in said bushes.

6. A conveyer chain comprising a plurality of links having side plates, bushes connecting said side plates, rollers revolvable on said bushes, a track for supporting said rollers, jointing pins connecting said side plates and bushes of one link to the side plates of the adjoining link, and actuating levers on said jointing pins, said jointing pins being mounted to turn eccentrically in said bushes.

KONRAD MÖRGELIN.